(12) United States Patent
Thom et al.

(10) Patent No.: US 6,479,276 B1
(45) Date of Patent: Nov. 12, 2002

(54) BIOLOGICAL FILTER APPARATUS

(75) Inventors: Randall R. Thom, Tualatin, OR (US);
Paul C. John, Beaverton, OR (US);
Charles S. Swift, Milwaukie, OR (US);
James Boswell, Montgomery, TX (US);
William C. Stewart, Gladstone, OR (US)

(73) Assignee: Bio-Reaction Industries, LLC, Tualatin, OR (US)

( * ) Notice: Subject to any disclaimer, the term of this patent is extended or adjusted under 35 U.S.C. 154(b) by 0 days.

(21) Appl. No.: 09/938,478

(22) Filed: Aug. 23, 2001

(51) Int. Cl.[7] ................................................. A61L 9/01
(52) U.S. Cl. ................ 435/266; 435/294.1; 435/297.1; 435/821; 210/615; 210/617; 210/620; 210/151; 96/122; 96/135
(58) Field of Search .............................. 435/262.5, 266, 435/294.1, 297.1, 821; 210/615, 617, 620, 151, 295, 314, 316; 96/121, 122, 131, 135

(56) References Cited

U.S. PATENT DOCUMENTS

| 5,480,538 A | * | 1/1996 | McCombs et al. ........... 210/151 |
| 5,861,303 A | * | 1/1999 | Barshter et al. ............. 435/266 |
| 6,069,004 A | * | 5/2000 | Teramachi et al. ........ 435/292.1 |
| 6,168,711 B1 | * | 1/2001 | Teramachi et al. .......... 210/123 |

* cited by examiner

Primary Examiner—David A. Redding
(74) Attorney, Agent, or Firm—John Smith-Hill; Smith-Hill and Bedell

(57) ABSTRACT

Air laden with biodegradable volatile organic compounds is passed sequentially through a first filter bed containing a biologically inert filter media and a second filter bed containing a biologically active filter media. Water is present in the biologically active filter media and the biologically inert filter media. Water that drains from the second filter bed is collected and supplied to the first filter bed.

11 Claims, 3 Drawing Sheets

BIOLOGICAL FILTER APPARATUS

BACKGROUND OF THE INVENTION

This invention relates to a biological filter apparatus and to a method of operating a biological filter apparatus.

U.S. Pat. No. 5,518,920 discloses a filter unit for treating biodegradable volatile organic compounds (VOCs). The filter unit includes a filter bed of organic compost containing a population of microorganisms that have an affinity for VOCs and consume VOCs and nutrients present in the compost. Air laden with the volatile organic compounds passes upwards through the filter bed and the microorganisms biologically convert the VOCs to non-toxic form, typically carbon dioxide and water. The filter bed is kept in a warm and moist condition by periodically spraying water onto the filter bed from above and by warming the air that flows into the filter bed. In this manner, favorable conditions for establishing and maintaining the population of microorganisms in the filter bed are provided.

Although the filter described in U.S. Pat. No. 5,518,920 is effective, there is nevertheless room for improvement in performance of the filter.

SUMMARY OF THE INVENTION

In accordance with a first aspect of the invention there is provided a filter apparatus for processing air laden with volatile organic compounds, said apparatus comprising a first wall means defining a first filter chamber and a second filter chamber, a first air inlet for admitting air to the first filter chamber, a first air outlet for exhausting air from the first filter chamber, a second air inlet, connected to said first air outlet, for admitting air leaving the first filter chamber to the second filter chamber, and a second air outlet for exhausting air from the second filter chamber, a biologically inert filter media in the first filter chamber, a biologically active filter media in the second filter chamber, a water supply means for supplying water to an upper region of the first filter chamber, a second wall means defining a sump for receiving water from a lower region of the second filter chamber, and a recirculation means for feeding water from the sump to the water supply means, whereby water received from the lower region of the second filter chamber is supplied to the upper region of the first filter chamber for wetting the biologically inert filter media.

In accordance with a second aspect of the invention there is provided a method of operating a filter for processing air laden with biodegradable volatile organic compounds, said method comprising (a) passing the air sequentially through first and second filter beds, the first filter bed containing a biologically inert filter media and the second filter bed containing a biologically active filter media, water being present in said biologically active filter media and said biologically inert filter media, (b) collecting water that drains from the second filter bed, and (c) supplying water collected in step (b) to the first filter bed.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numerals are used to designate like or corresponding elements.

DETAILED DESCRIPTION

Figure 1:
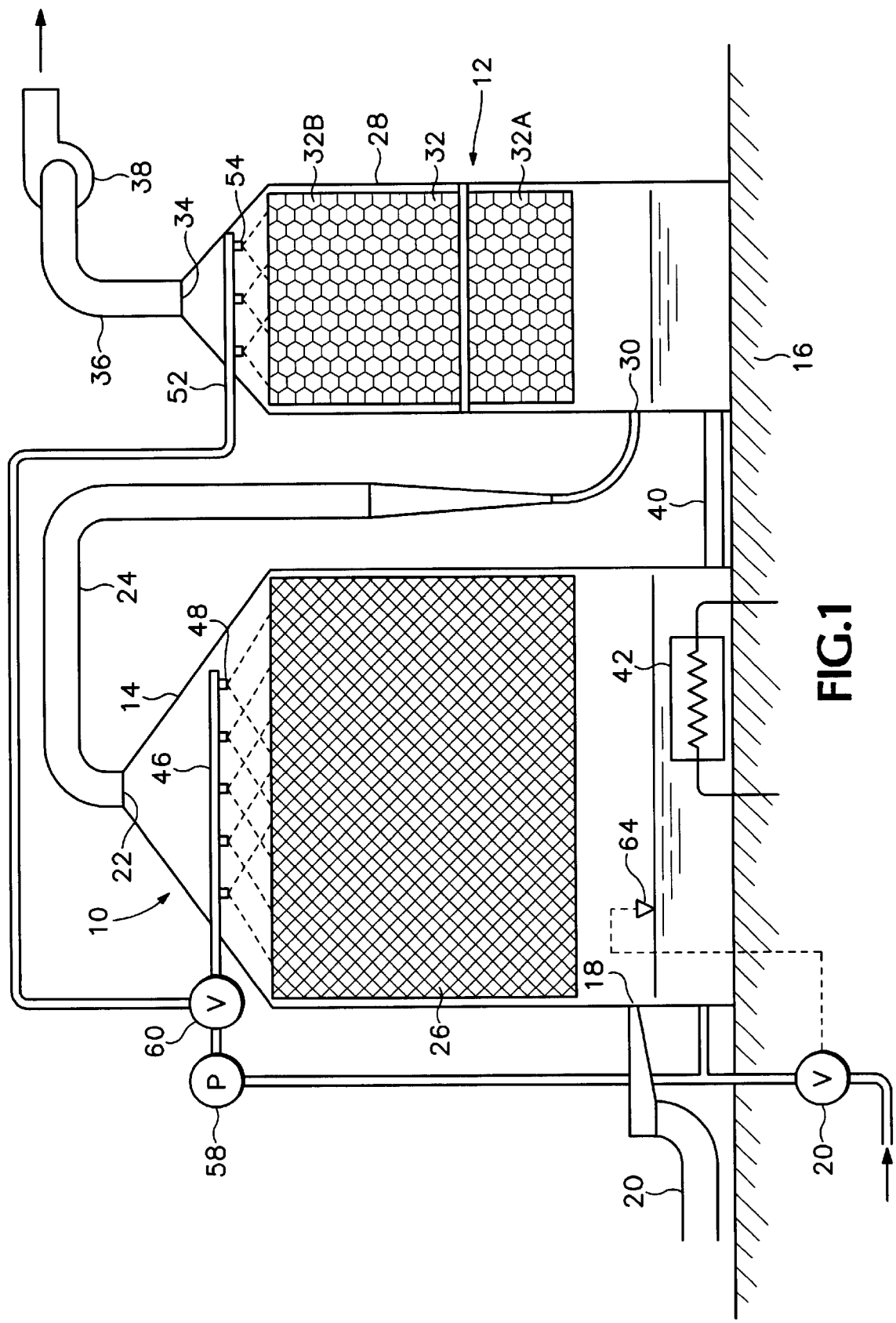
FIG. 1 is a schematic sectional view of a first filter in accordance with the invention.

The filter shown in FIG. 1 comprises a trickling filter unit 10 and a biological filter unit 12. The trickling filter unit includes a housing 14 resting on a floor 16. The housing 14 has an inlet opening 18 and an air supply duct 20 connects a space that contains air laden with VOCs to the inlet opening 18. Preferably, the inlet opening 13 is rectangular and its width is substantially greater than its height so that the inlet air flow is distributed across the width of the housing 14. A fan out transition fitting is employed to connect the circular section supply duct 20 to the inlet opening 18. The housing 14 has an outlet opening 22 connected to a duct 24.

The housing 14 contains a support grid (not specifically shown) above the inlet opening 18. A biologically inert filter bed 26 composed of a cross flow filter media rests on the support grid. The cross flow media is made of corrugated sheets of synthetic polymer material. The corrugated sheets are bonded together in face-to-face relationship with the channels of alternate sheets inclined to each other at about 60°. One suitable form of material is commercially available from Brentwood Industries, Inc. of Reading, Penn. The cross flow media is oriented with the sheets generally vertical so that the channels pass upwards within the filter bed 26 and are inclined at about 30° to vertical.

The biological filter unit 12 includes a housing 28 resting on the floor 16 and having an inlet opening 30 at about the same height as the inlet opening 18 of the housing 14. The duct 24 is connected to the inlet opening 30. Preferably, the inlet opening 30 is rectangular and its width is substantially greater than its height and a transition fitting is used to connect the circular section duct 24 to the inlet opening 30.

The housing 28 is provided with a support grid (not specifically shown) above the inlet opening 30 and a filter bed 32 rests on the support grid. The filter bed 32 is a composite bed that includes a lower bed 32A of biologically inert cross flow media and an upper bed 32B of biologically active filter media. Preferably, the biologically active filter media is composed of compost balls made in the manner described in co-pending patent application Ser. No. 09/938, 466 filed Aug. 23, 2001, the entire disclosure of which is hereby incorporated by reference herein for all purposes. The housing 28 has an outlet opening 34 which is connected by a duct 36 to the suction side of a blower 38.

The inlet opening 18 of the housing 14 and the inlet opening 30 of the housing 28 are positioned at a significant height above the floor 16. The housing 14 is connected to the housing 28 by a tie line 40 which is only slightly above the floor 16 and is well below the inlet openings 18 and 30. Accordingly, the housing 14 provides a scrubber sump below the inlet opening 18 for collecting water that drains from the filter bed 26 and the housing 28 provides a filter sump below the inlet opening 30 for collecting water that drains from the filter bed 32, the two sumps being connected by the tie line 40. The scrubber sump is provided with a thermostatically-controlled electrical resistance heater 42 for heating the water in the scrubber sump.

A spray tube 46 is mounted in the housing 14 above the filter bed 26 and is provided with nozzles 48 for spraying water onto the filter bed 26. Similarly, a spray tube 52 is provided in the housing 28 above the filter bed 32 and is provided with nozzles 54 for spraying water on the filter bed 32. A water pump 58 has its suction side connected to the scrubber sump and its pressure side connected to the spray tubes 46 and 52 by way of a proportioning valve 60 which distributes the flow provided by the pump between the spray tubes 46 and 52. A level detector 64 detects whether the free surface of liquid in the scrubber sump is below a nominal maximum level and controls a valve 66 connecting a source of water under pressure to the scrubber sump.

In operation of the apparatus shown in FIG. 1, the blower 38 induces a flow of air laden with VOCs through the duct 20, the housing 14, the duct 24, the housing 28 and the duct 36 and the pump 58 draws warm water from the scrubber sump and sprays the water onto the two filter beds 26 and 32. The warm water trickling down through the filter bed 26 scrubs the air flowing upward through the filter bed 26. This action conditions the upward flow of air by warming and humidifying it. Moreover, water soluble VOCs, such as certain alcohols, are removed from the vapor phase and dissolved in the water. Some of the water sprayed onto the filter bed 26 is retained in depressions or pockets formed in the flanks of the corrugations of the cross flow media.

The conditioned air that leaves the housing 14 through the outlet opening 22 passes through the duct 24 and enters the housing 28 through the inlet opening 30. The air flows upwards through the lower filter bed 32A, which serves to distribute the flow over the cross-sectional area of the housing 28, and the air then flows upwards through the upper filter bed 32B. Microorganisms present in the filter bed 32B capture and consume biodegradable VOCs present in the air entering the filter bed 32B and convert them to non-toxic form, typically carbon dioxide and water. Accordingly, the biofilter unit 12 removes biodegradable VOCs from the feed air flow and supplies an outlet air flow having a substantially lower concentration of biodegradable VOCs than the feed air flow.

The filter bed 32B is maintained in favorable condition for the population of microorganisms by the warm water that is sprayed onto the filter bed from the spray tube 46.

The pump 54 sprays water onto the filter bed 26 and the filter bed 32 at a rate that exceeds the rate of evaporation from the respective beds, so that water drains from the filter beds 26 and 32 into the scrubber sump and the filter sump respectively. Since the sumps are connected by the tie line 40, when water is drawn from the scrubber sump, replacement water flows into the scrubber sump from the filter sump.

The downward flow of water through the filter bed 32B results in some erosion of compost particles from the compost balls and transportation of compost particles suspended in the water flow into the filter sump. In addition, some microorganisms are removed from the compost by the water flow, and the water flow leaches nutrients from the compost. The water that drains from the filter bed 32 into the filter sump thus forms a soup or tea in the filter sump and scrubber sump. The tea that is retained in the filter bed 26 provides a significant population of microorganisms in the trickling filter. These microorganisms digest the VOCs that are trapped by the water. In the event that the conditions in the trickling filter unit 10 are not optimum for breakdown of VOCs dissolved in the water, the recirculation of the water ultimately conveys the VOCs to the biofilter unit 12 where there is a greater population of microorganisms and biological breakdown can take place with greater efficacy.

Transfer of compost particles and nutrients from the biofilter unit to the trickling filter unit provides favorable conditions for the biological population of the trickling filter unit.

In the event that the water level in the scrubber sump falls below the nominal minimum level set by the level detector 64, the level detector opens the valve 66, admitting replenishment water to the sump.

It will be appreciated from the foregoing that the filter shown in FIG. 1 provides at least two distinct environments for biological breakdown of VOCs present in the feed air, namely the filter bed 26 and the filter bed 32B. In addition, VOCs that are dissolved in the water that drains from the filter bed 26 or 32 into the common sump are subject to breakdown by microorganisms present in the sump.

In a modification of the filter shown in FIG. 1, the inlet opening 18 to the housing 14 is below the free surface of water in the scrubber sump and accordingly the feed air entering the housing 14 bubbles through the tea in the scrubber sump. This then provides the possibility of removing VOCs that are not water soluble in the scrubber sump, in addition to removing VOCs from the air by biological action in the filter bed 26 and in the filter bed 32B. However, this modification is subject to the disadvantage that more energy is required to operate the blower 38 because of the back pressure presented by the tea to flow of air from the inlet opening.

The biological filter unit 12 is more expensive to manufacture than the trickling filter unit 10. Accordingly, the trickling filter unit 10 proves a relatively low-cost means for reducing the load on the biological filter unit.

Figure 2:
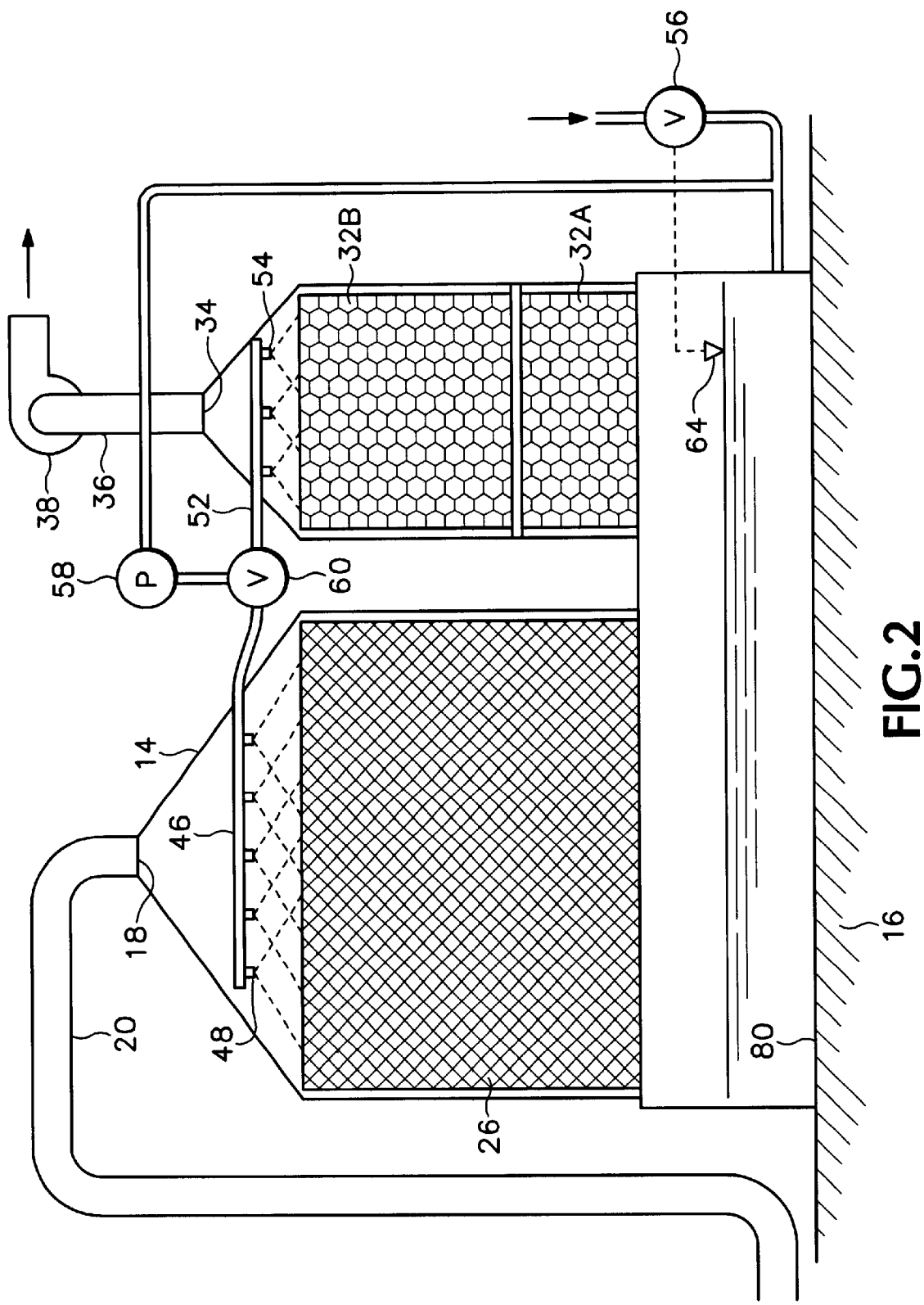
FIG. 2 is a similar view of a second filter in accordance with the invention.

The filter shown in FIG. 2 comprises a tank 80 and the two housings 14, 28 extending upward from the tank 80. The inlet opening 18 is at the upper end of the housing 14. When the blower 38 is operated, it induces a flow of air through the duct 20, the housing 14, the tank 80, the housing 28 and the duct 36 and discharges to atmosphere.

The pump 58 draws warm water from the tank 80 and sprays the water onto the two filter beds 26 and 32. The manner of operation of the filter shown in FIG. 2 will be understood from the foregoing description of the manner of operation of the filter shown in FIG. 1. It will be observed that in the case of FIG. 2, the air flows downwards through the trickling filter unit.

Figure 3:
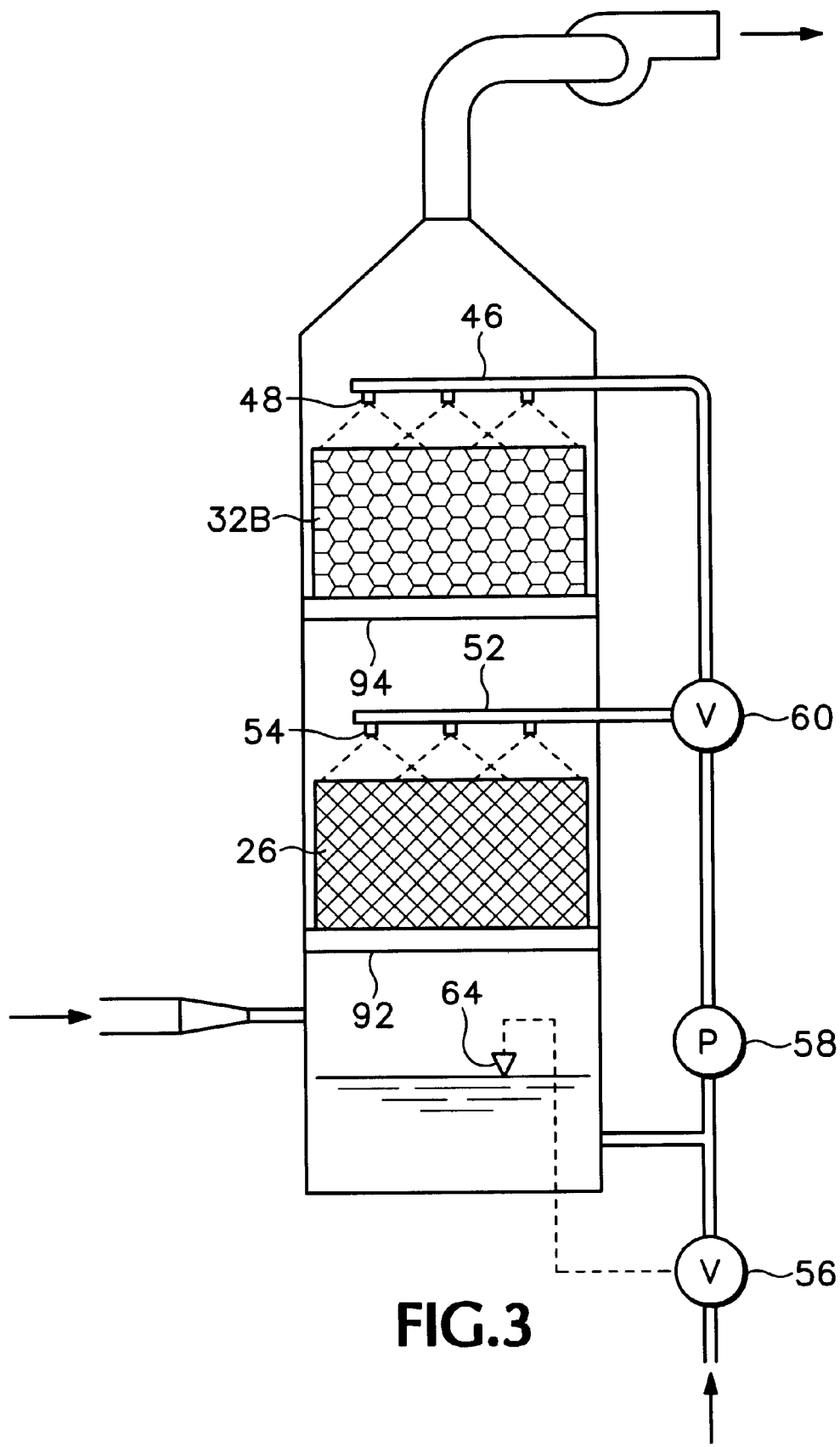
FIG. 3 is a similar view of a third filter in accordance with the invention.

The filter shown in FIG. 3 comprises a housing 90 that is provided with lower and upper support grids 92 and 94. The lower grid 92 supports the biologically inert cross flow filter bed 26 and the upper grid 94 supports the biologically active filter bed 32B. The filter bed 26 serves not only to scrub and condition the air supplied to the filter bed 32B but also to distribute the air uniformly over the cross section of the housing. In the case of FIG. 3, water sprayed onto the filter bed 32B drains onto the filter bed 26 and supplies particles of compost, microorganisms and dissolved nutrients to the trickling filter.

The manner of operation of the filter shown in FIG. 3 will be understood from the foregoing description of the manner of operation of the filter shown in FIG. 1.

It is important to establish and maintain favorable conditions for the microorganisms in the filter beds with respect to both warmth and moisture. In the case of the described embodiments, this is accomplished by spraying warm water on the filter beds. It will be appreciated that other methods of supplying adequate warmth and moisture are available, including, for example, injecting steam beneath the filter bed as shown in Provisional Application No. 60/245,763.

FIG. 1 shows an electrical resistance heater for heating the tea in the scrubber sump, but it will be appreciated that any other suitable means may be used for heating the tea, such as a thermally conductive tube conducting a flow of hot water or steam in heat-exchange relationship with the tea.

It will be appreciated that the invention is not restricted to the particular embodiment that has been described, and that variations may be made therein without departing from the scope of the invention as defined in the appended claims and equivalents thereof. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

What is claimed is:

1. A filter apparatus for processing air laden with volatile organic compounds, said apparatus comprising:

a first wall means defining a first filter chamber and a second filter chamber, a first air inlet for admitting air to the first filter chamber, a first air outlet for exhausting air from the first filter chamber, a second air inlet, connected to said first air outlet, for admitting air leaving the first filter chamber to the second filter chamber, and a second air outlet for exhausting air from the second filter chamber, a biologically inert filter media in the first filter chamber, a biologically active filter media in the second filter chamber, a water supply means for supplying water to an upper region of the first filter chamber, a second wall means defining a sump for receiving water from a lower region of the second filter chamber, and a recirculation means for feeding water from the sump to the water supply means, whereby water received from the lower region of the second filter chamber is supplied to the upper region of the first filter chamber for wetting the biologically inert filter media.

2. A filter apparatus according to claim 1, comprising first and second water supply means for supplying water to upper regions of the first and second filter chambers respectively.

3. A filter apparatus according to claim 2, wherein the sump defined by the second wall means receives water from both a lower region of the first filter chamber and a lower region of the second filter chamber.

4. A filter apparatus according to claim 2, wherein the recirculation means feeds water from the sump to the first and second water supply means.

5. Apparatus according to claim 1, wherein the first wall means comprises first and second housings defining the first filter chamber and the second filter chamber respectively, and the second wall means defines a first sump region for receiving water from a lower region of the first filter chamber and a second sump region for receiving water from a lower region of the second filter chamber, the first and second sump regions being in open communication.

6. Apparatus according to claim 5, comprising a means for introducing water to the sump for maintaining the free surface of water in the sump at a predetermined level and wherein the first air inlet is above the predetermined level.

7. Apparatus according to claim 1, wherein the biologically inert filter media is a cross flow media.

8. Apparatus according to claim 1, wherein the biologically active media is composed of a plurality of cohesive bodies of compost.

9. Apparatus according to claim 1, wherein the first wall means comprises an upper region of a housing defining both the first chamber and the second chamber, the first chamber being below the second chamber, and the second wall means comprises a lower region of the housing.

10. A method of operating a filter for processing air laden with biodegradable volatile organic compounds, said method comprising:

(a) passing the air sequentially through first and second filter beds, the first filter bed containing a biologically inert filter media and the second filter bed containing a biologically active filter media, water being present in said biologically active filter media and said biologically inert filter media, (b) collecting water that drains from the second filter bed, and (c) supplying water collected in step (b) to the first filter bed.

11. A method according to claim 10, wherein step (b) comprises collecting water that drains from the first filter bed and the second filter bed and step (c) comprises supplying water collected in step (b) to the first filter bed and the second filter bed.

* * * * *